United States Patent
Watt

[11] 3,765,732
[45] Oct. 16, 1973

[54] OUTLET RESTRICTOR HYDROSTATIC BEARING

[76] Inventor: Gordon James Watt, Apt. 106, 245 Unquowa Rd., Fairfield, Conn. 06430

[22] Filed: Feb. 28, 1972

[21] Appl. No.: 229,631

[52] U.S. Cl. .................................................. 308/9
[51] Int. Cl. ............................................. F16c 17/16
[58] Field of Search ............................ 308/9, 122 A

[56] References Cited
UNITED STATES PATENTS
3,635,534   1/1972   Barnett ............................... 308/121
FOREIGN PATENTS OR APPLICATIONS
1,089,737   10/1954   France ..................................... 308/9

Primary Examiner—Manuel A. Antonakas
Assistant Examiner—Frank Susko
Attorney—S. Delvalle Goldsmith et al.

[57] ABSTRACT

An improved structure for outlet restrictor hydrostatic bearings of the tapered, stepped, and grooved clearance types wherein the bearing surfaces are formed on flexible membranes, supported at the edges by raised lands on the shafts and/or the bores, thereby simplifying the manufacturing process and providing improved bearing action after the manner of the flexible membrane bearing.

5 Claims, 5 Drawing Figures

Patented Oct. 16, 1973
3,765,732
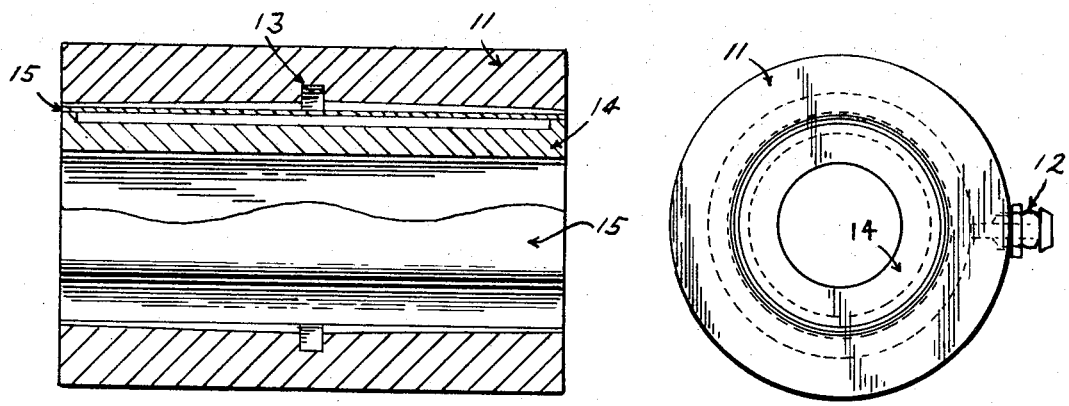
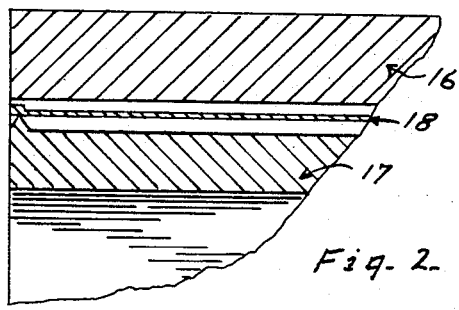
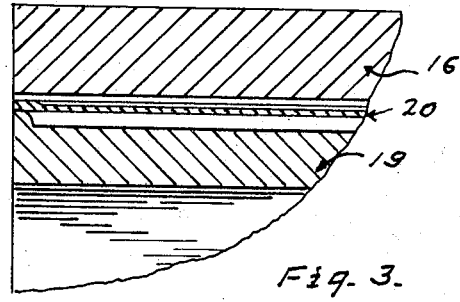
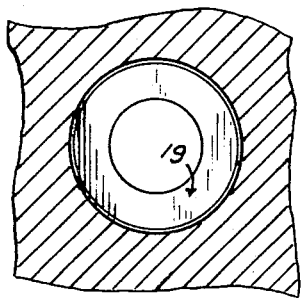
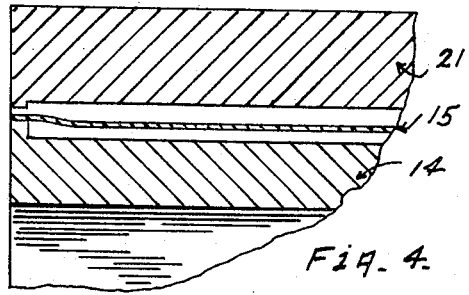
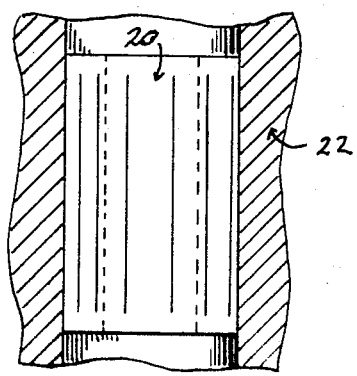

OUTLET RESTRICTOR HYDROSTATIC BEARING

BACKGROUND OF THE INVENTION

The structure and operation of outlet restrictor hydrostatic bearings are fully explained in other patent disclosures. Those which pertain to improvements which are the subject of this disclosure include, U.S. Pat. No. 3,112,140, U.S. Pat. No. 3,305,282, U.S. Pat. No. 3,517,973, and my copending application for Flexible Membrane Bearing, Ser. No. 159,608 filed July 6, 1971. When the principles of the flexible membrane bearing are applied to other outlet restrictor types, bearing action is improved by the control feedback action which results when the bearing surface deflects relative to the shaft or housing when pressure gradients vary with load.

Other advantages accrue when a edge supported substrate is used to form the desired clearance profile for the tapered, stepped, or grooved bearing surfaces. For instance, more economical methods for manufacture may be employed. The surface patterns ordinarily machined on the rigid bearings, may be formed on the membrane shells by drawing or coining. The membrane surfaces may be stress relieved into the final geometry after the manner of the flexible membrane bearing. When the bearing is in use, it may be damped or controlled by varying the pressure in a liquid in the cavity between the back of the membrane and its supporting structure, after the manner of the flexible membrane bearing. The initial clearance profile may be produced in part by shrinking the substrate on the preformed lands and taking advantage of the edge effects which are transmitted laterally for a few membrane thicknesses.

SUMMARY OF THE INVENTION

My invention combines the features of outlet restrictor hydrostatic bearings whose action depends on clearance profiles formed on rigid substrates with the additional features provided by the controlled compliance of a thin shell selectively supported at the edges or at other sections of the surface. Providing a flexible membrane substrate adds design parameters which may be varied to improve bearing performance. Of most value are the modes of extensional and inextensional deformation of thin shells wherein compliance depends on geometric location of narrow supports, thickness of the membrane, and characteristics of the membrane material relative to the operating conditions and material of the shaft or housing. Thereby the operating clearance may be controlled by other factors in addition to the shaft displacement.

The inherent structure afforded by my invention makes possible other manufacturing methods not heretofore applicable to the rigid bearing structure. Of primary importance is the ability to stress relieve certain membrane materials like aluminum into the shape of reference mating surfaces formed in a die. In one form of the disclosure, an end supported tube with surface grooves is inserted into a cylindrical cavity in the die, and thereafter expanded to interfere by differential thermal expansion while it is soaked at the stress relief temperature for the prescribed time. Stresses set up by the forming process are ironed out while the membrane is held in the final desired shape. This makes possible the forming of grooves, steps, or tapers by drawing or coining processes and the ability to cope with the large residual stresses which ordinarily ensue. This is particularly important because of the low tolerances necessary in the low clearance bearings and the costs of holding said tolerances.

The embodiment discussed with reference to the drawings is a common form of journal bearing comprising two pairs of bearing surfaces with a manifold between to supply fluid under pressure to the inlet edge of each pair. This is not to limit the concepts disclosed here to journal bearings for the advantages cited are just as applicable to other geometric forms such as cones, cylinders, and planes. In certain applications one pair of surfaces may have a certain geometry and be combined with a pair of different geometry, such as a thrust bearing in combination with a spherical bearing.

BRIEF DESCRIPTION OF THE DRAWINGS

FIG. 1 is the section of a journal bearing of the tapered outlet restrictor hydrostatic bearing type. The bearing surface is formed by the smooth bore of the housing and the membrane tube supported on the shaft. The taper is formed in the housing by making the bore slightly barrel shaped.

FIG. 2 shows a step bearing formed by steps at either end of a membrane tube supported by lands with sharp edges. The bore is smooth except for the annular groove which supplies fluid under pressure.

FIG. 3 shows grooves in the surface of the tube. The lands at either end of the shaft have rounded edges. The bore is smooth.

FIG. 4 shows a cylindrical membrane surface on the shaft with a stepped bearing surface in the bore.

FIG. 5 illustrates the method of final forming and stress relief of a grooved membrane shaft. The die material has a lower coefficient of thermal expansion than the shaft assembly.

DETAILED DESCRIPTION OF THE DRAWINGS

Referring now to the drawings and in particular to FIG. 1, there is shown a partially sectioned plan view of a typical outlet restrictor hydrostatic bearing utilizing the flexible membrane structure in a manner of the improvement disclosed herein. The housing 11 of this dual journal bearing is a thick cylinder bored through on its axis to form the outer pair of bearing surfaces. The bored hole is slightly enlarged toward the center to be shaped slightly like a barrel, tapering toward the ends only a few tenths of a thousandth of an inch per inch. Fluid is fed to the central region of the housing through the pressure fitting 12 and into a radial hole which penetrates through to the annular groove 13 midway between the ends of the housing.

The journal comprises a cylindrical shaft 14 with raised lands at either end to support a cylindrical sleeve 15 to form the opposed pair of bearing surfaces. This sleeve is a flexible membrane supported at the edges in a manner to provide strength and accuracy to the structure. Clearance between the smooth cylindrical surface of the shaft and the bore is only a few tenths of a thousandth of an inch at the ends. The clearance and taper are exaggerated in FIG. 1 to show the details more clearly, in the situation where the shaft is centered when the bearing is not being supplied with fluid. When fluid is supplied, the flow is through the fitting 12 into the annular groove 13 and thence outward between the bearing surfaces to exit at either end.

Lateral pressure gradients associated with the fluid flow produce a centering force on the journal. The smaller clearance at the outlet meters the flow and acts to produce greater pressures upstream in the region closed down by displacement of the shaft. The effect of pressure on the membrane surface produces a deflection of the membrane with respect to the supporting shaft. Since the membrane deflects more in the areas where the pressure is higher, clearance is increased where the pressure is increased. This reaction of the membrane to changes in pressure constitutes a form of positive feedback in the mechanism of control which causes the bearing to center. These matters are discussed in detail in the referenced patents and in my aforesaid copending application for Flexible Membrane Bearing.

The next figures show only across section of the bearings near the outlet end, the other details being the same as shown in FIG. 1. The bore of the housing 16 of FIG. 2 is cylindrical and not barrel shaped. The supporting lands on the shaft 17 have sharp edges to support the membrane tube 18. The outlet restriction is provided by slight steps at the outlet edge on the surface of 18. Otherwise the principles of operation are similar to the bearing shown in FIG. 1. Edge effects near the ends of the membrane differ slightly from FIG. 1 in that the surface may slope in FIG. 2 when pressure is increased between the bearing surfaces.

Another type of outlet restrictor bearing is shown in FIG. 3 with the same housing 16, a through cylindrical bore. The lands on the shaft 19 have rounded edges which allow the edge of the membrane to tilt when pressure is increased in the bearing area. The flexible tube 20 has axial grooves cut in the surface extending to the end regions but not to the end of the bearing surfaces. These grooves are provided to reduce resistance to flow in the main bearing area with an additional function of providing a preferred path for flow in the axial direction. Otherwise the principles of operation are similar to those already discussed with respect to the previous figures.

The variation shown in FIG. 4 uses the same shaft assembly as in FIG. 1. The outlet restrictor is provided by small steps at either end of the bore in the housing 21. Aside from the steps, the bore is cylindrical and straight as in housing 16 above. The slight edge effect noticed in the membrane 15 of FIG. 4 results from shrinking the sleeve on the shaft to produce a slightly smaller outside diameter away from the ends. Since the top of the lands are flat, the slope of the surface near the ends must be parallel to the axis. Had either of the lands shown in FIGS. 2 or 3 been used, the membrane would tilt at the ends and the effect would extend a similar distance toward the center.

In FIG. 5, the shaft assembly of FIG. 3 is shown in a die 22 used in the heat treating process for ironing out stresses and strains in the membrane. The shaft assembly has a higher coefficient of thermal expansion than the die. The hole in the die has been formed at the proper heat treating temperature for stress relief of the membrane material. The shaft assembly fits the die loosely at room temperature and expands to fill the hole with slight interference at the stress relief temperature. The surface grooves in the membrane surface 20 are visible in FIG. 5.

The foregoing figures are meant to illustrate some of the different forms and variations of structures made possible by using the teachings of my invention for improving the outlet restrictor hydrostatic bearing. The journal bearing used as a preferred embodiment for discussion was chosen primarily because journal bearings are the subject of the referenced patents for stepped and grooved bearings. Introduction of the flexible membrane into the design of other geometric forms provides a similar improvement in structure for performance and economy of manufacture.

Introduction of a flexible membrane surface does not change the principles of operation for the referenced outlet restrictor hydrostatic bearings. It does, however, provide new means for feedback in the control loop including closed loop gain, damping, and introduction of outside signals for control. These and other features are made clear in the claims which follow.

I claim:

1. An outlet restrictor hydrostatic bearing structure comprising a pair of relatively movable bearing members having opposed bearing surfaces separated by a small clearance through which pressurized lubricating fluid may be passed to provide bearing action, one of the opposed bearing surfaces being rigid and being shaped so that said clearance converges gradually in the direction of fluid flow, the other opposed bearing surface, except at respective regions of its ends, being compliable and capable, in response to fluid pressure between the opposed bearing surfaces, of enlarging said clearance.

2. An outlet restrictor hydrostatic bearing structure according to claim 1, wherein the compliable bearing surface is defined by a flexible membrane supported at its ends by raised lands of its respective bearing member.

3. An outlet restrictor hydrostatic bearing structure according to claim 2, wherein the bearing member having the flexible membrane is a journal, while the bearing member having the rigid bearing surface is a housing for the journal.

4. An outlet restrictor hydrostatic bearing structure according to claim 3, wherein the rigid bearing surface is defined by a generally cylindrical bore through the housing, a portion of said bore intermediate the ends thereof having an annular groove from each side of which the bore tapers slightly towards its ends, the housing having means including a passageway adapted to introduce pressurized lubricating fluid to said annular groove from a fluid source external of said housing, whereby fluid so introduced will flow through the clearance between the bearing surfaces in opposite directions from the groove.

5. An outlet restrictor hydrostatic bearing structure according to claim 4, wherein the housing is cylindrical and the bore is coaxial therewith, the annular groove being located midway between the ends of the bore.

* * * * *